United States Patent [19]

Jaeger et al.

[11] Patent Number: 4,660,928
[45] Date of Patent: Apr. 28, 1987

[54] HIGH TENSILE STRENGTH OPTICAL FIBER

[75] Inventors: Raymond E. Jaeger; Mohd Aslami, both of Sturbridge, Mass.

[73] Assignee: SpecTran Corporation, Sturbridge, Mass.

[21] Appl. No.: 653,113

[22] Filed: Sep. 21, 1984

[51] Int. Cl.$^4$ .................. G02B 6/22; G02B 6/16; G02B 6/44
[52] U.S. Cl. .............. 350/96.33; 350/96.29; 350/96.30
[58] Field of Search .......... 350/96.29, 96.30, 96.33, 350/96.34

[56] References Cited

U.S. PATENT DOCUMENTS

| | | | |
|---|---|---|---|
| 3,445,666 | 5/1979 | Snaper | 350/96.29 X |
| 3,701,131 | 10/1972 | Brauser et al. | 350/151 X |
| 4,184,860 | 1/1980 | Schneider et al. | 350/96.30 X |
| 4,243,298 | 1/1981 | Kao et al. | 350/96.33 |
| 4,521,073 | 6/1985 | Murakami et al. | 350/96.34 |

OTHER PUBLICATIONS

"Metallic-Glass Fiber-Optic Phase Modulators" by Frank Trowbridge, Optical Society of America, 1981.

*Primary Examiner*—William L. Sikes
*Assistant Examiner*—Akm E. Ullah
*Attorney, Agent, or Firm*—Pennie & Edmonds

[57] ABSTRACT

A concentric core optical fiber comprised of an inorganic crystalline, preferably metallic, central core and an optical waveguide having an optical ring core and inner- and outer-glass cladding layers concentrically clad to the central core is described. A long length of such an optical fiber can advantageously support a heavy load for a substantial period of time without fatiguing while providing a transmission medium for optical and/or electrical signals.

15 Claims, 4 Drawing Figures

HIGH TENSILE STRENGTH OPTICAL FIBER

BACKGROUND OF THE INVENTION

1. Field of the Invention

The invention relates to optical fibers and, more particularly, to optical fibers which have a high tensile strength and can thus withstand a substantial amount of stress.

2. Description of the Prior Art

Often instrument packages are suspended by cables and lowered down vertical passages, such as, for example, oil or gas well-heads. As an instrument package is lowered down the well, it maps the existence and depth location of various geological phenomena, such as mineral bearing strata. Power for the instruments and signals emanating from the instruments are transmitted through cables to various electronic systems, e.g., control electronics and recorders, all located on the surface. By virtue of the small diameter of the well hole, the diameter of the cable must be kept small. In addition, the cable must be able to withstand the high tensile load imparted to it by the suspended instrument package.

As noted in, B. A. Proctor et al., "The Strength of Fused Silica," *Proc. R. Soc. London,* Series A 297, pages 534–557, glass fibers are among the strongest known materials with theoretical tensile strengths approaching $2 \times 10^6$ psi. Presently existing glass fibers are available in diameters ranging from 0.125 mm to 0.250 mm. By virtue of the small resulting cross-sectional size, a single glass fiber is disadvantageously incapable of sustaining a large tensile load.

Consequently, a cable which can withstand a moderate level of stress typically contains a number of these fibers intertwined with an array of separate strength members, such as steel wire or any one of several well known non-metallic members such as Kevlar TM (a trademark owned by E. I. duPont de Nemours and Co.) brand yarn manufactured by DuPont. However, for a number of reasons, such cables are often inadequate in the above-mentioned application of suspending an instrument package and lowering it down an oil or gas well-head. Specifically, as the cable is designed to withstand increasingly larger amounts of stress necessitated by supporting increasingly heavier instrument packages, the diameter and/or number of necessary strength members used in the cable disadvantageously increases. Consequently, such a cable containing both glass fibers and strength members often becomes excessively thick and quite unwieldy.

SUMMARY OF THE INVENTION

Accordingly, it is an object of the present invention to provide an optical fiber having improved load bearing characteristics.

A particular object of the invention is to provide a cable containing these optical fibers, which advantageously is of minimal thickness and easy to handle.

These and other objects are achieved in accordance with the present invention by placing the strength member in the central core of the fiber and cladding at least one layer of optical glass to the strength member. By choosing an inorganic crystalline material which has a high tensile strength and a high elastic modulus for the strength member, the resulting composite fiber is able to withstand substantial levels of stress. If multiple layers of glass, each having an appropriate index of refraction, are clad to the central core, then an optical waveguide can be produced in which one of these layers advantageously serves as an optical ring core and provides a low-loss transmission path for optical signals.

In addition, the strength member is chosen to have a higher thermal expansion coefficient than that of any of the glass cladding layers. This, in turn, permits the fiber to be manufactured such that each glass cladding layer normally exists in a state of compression which, in turn, advantageously increases the overall tensile strength of the fiber.

Furthermore, in accordance with the preferred embodiment disclosed herein, if a metallic material is used for the strength member, then electrical control signals and/or power can be transmitted through the central core, while signals requiring a wide bandwidth, such as data, can optically propagate through the optical waveguide that surrounds the central core.

BRIEF DESCRIPTION OF THE DRAWING

The invention may be clearly understood from a consideration of the following detailed description and accompanying drawing in which.

To facilitate easy understanding, identical reference numerals are used to denote identical elements common to the figures.

DETAILED DESCRIPTION

In well logging applications, instrument packages are often lowered down well-holes to measure geological phenomena occurring at various depths below the surface or ground level. The instrument package is typically suspended by a cable, which not only supports the package but transmits electrical signals between the instrument package and various electrical systems located at the surface. These systems typically comprise power supplies, control electronics and recorders.

Figure 1:
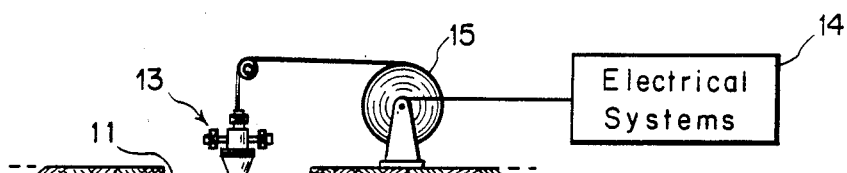
FIG. 1 is a simplified diagram of well logging apparatus which incorporates cable 16 for suspending an instrument package.

As shown in FIG. 1, well-hole 12 has been drilled from the surface of ground 11 to a predetermined depth. Instrument package 17 has been inserted into well hole 12 via well head 13. The instrument package is suspended by cable 16, containing separate glass fibers, which not only provides physical support for the package but advantageously provides a transmission path for signals being transmitted between electrical systems 14 located on the surface and the electronics contained within the instrument package. Cable 16 is usually jacketed with suitable well-known protective armoring which, for purposes of simplicity, is not shown in any of the figures. Electrical systems 14 typically contain circuitry which provides electrical energy to power the instrument package, electronics which control the operation of the instruments and recorders which provide a permanent record of all the data sensed by the instruments. The depth to which the instrument package is lowered is determined by the amount of cable 16 which is unwound from spool 15 (by apparatus not shown).

Consequently, the entire weight of not only the instrument package but also the cable and particularly its armoring is supported by the cable. This results in the application of an upwardly directed stress or tensile force imparted to the fiber.

It is known that the tensile strength of a cable containing glass fibers, can be increased if separate strength members are intertwined with the glass fibers. However, such a cable can become excessively thick and unwieldly if it is designed to withstand significant stress loads such as those that occur when the cable is used to support heavy loads, such as instrument packages and armoring.

The present invention, therefore, is directed to fibers (both clad wire and optical fibers) for use in a cable such that the cable can advantageously be designed to withstand a substantial amount of stress without becoming excessively thick or unwieldly.

Figure 2:
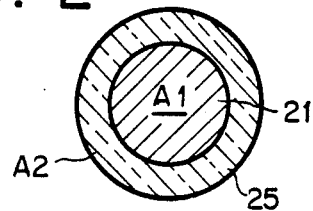
FIG. 2 is an enlarged cross-sectional view of a clad wire which incorporates the teachings of the present invention and which may form part of cable 16 shown in FIG. 1.
Figure 3:
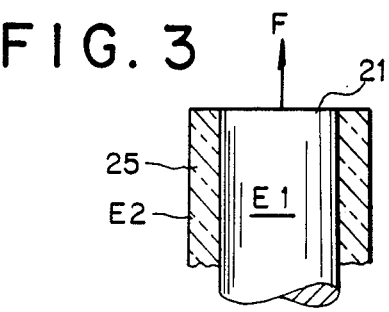
FIG. 3 is an enlarged longitudinal cross-sectional view of a portion of the clad wire shown in FIG. 2.

An enlarged cross-sectional view of a clad wire which embodies the teachings of the present invention and which may form part of cable 16, is shown in FIGS. 2 and 3. Specifically, the clad wire is constructed of a strength member, i.e. metallic core 21 of cross-sectional area $A_1$, coaxially surrounded by a glass cladding layer 25 having cross-sectional area $A_2$. Core 21 is comprised of an inorganic crystalline material having a high elastic modulus. Suitable materials are typified by the metals: nickel, titanium, tungsten, molybdenum, iron, copper and aluminum. These metals are readily and inexpensively available in the form of wire of suitable gauges. Other materials that can be used include graphite, aluminum oxide (sapphire), boron nitride or silicon nitride.

Figure 4:
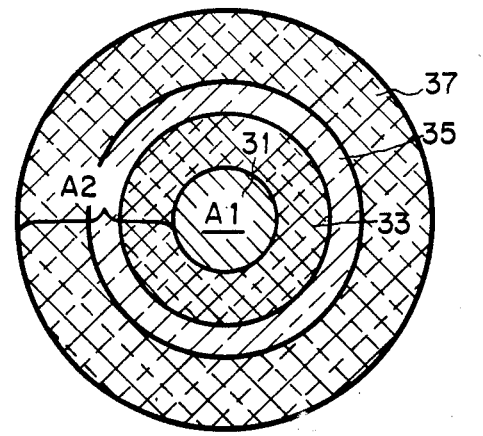
FIG. 4 is an enlarged cross-sectional view of an optical fiber, which also incorporates the teachings of this present invention and which may form part of cable 16 shown in FIG. 1.

A cross-sectional view of a (dual-core) optical fiber, which embodies the teachings of the present invention and which may form part of cable 16, is shown in FIG. 4. As shown, several glass cladding layers may be advantageously utilized in order to form an optical waveguide comprised of optical ring core 35 surrounded by inner glass cladding layer 33 and outer glass cladding layer 37.

The optical waveguide is first manufactured as a hollow optical waveguide preform using the "Inside Tube CVD Technique" which is fully described in "Air Force Final Report on Concentric Core Fiber Development, Contract No. F19628-80-C-0200" and in section 8.4.4, "Modified Chemical Vapor Deposition" of S. Miller et al, *Optical Fiber Telecommunications*, (c. 1979: Academic Press, New York). Alternatively, the hollow optical waveguide preform can be fabricated by successively depositing a series of cladding layers using the well-known outside soot vapor deposition process, as described for example, in Section 8.4.2, "Flame Hydrolysis (Soot) Techniques" of the same Miller et al textbook. Thereafter, the hollow preform is mounted in a suitable draw tower (not shown) and metallic wire is then inserted into the central opening in the preform. Both the wire and the glass are then simultaneously heated. This, in turn, causes the wire to expand in a lengthwise direction and the glass tube to become quite plastic and completely collapse around the metallic wire which forms the central core as the preform is drawn into fiber. As a result, an optical waveguide, having a ring core and inner- and outer-glass cladding layers, is concentrically formed around and coaxially oriented with the metallic core. The coefficient of expansion of the metallic central core is selected to be greater than that of the glass cladding layer. As the composite fiber cools down to room temperature, the unequal values of the thermal expansion coefficients of the metallic central core and glass layers place the glass layers in compression. This further increases the maximum load bearing characteristic of the fiber by further balancing the stress loads to which the central core and the optical waveguide are subjected. The amount of compression that results is partially governed by the particular material used for the central core. With this technique, an intimate bond is created at the metal/glass interface between the central core and cladding layers.

For the embodiment shown in FIG. 4, metallic core 31 is illustratively comprised of tungsten wire having a diameter of approximately 40 $\mu$m (micrometers or microns). Optical ring core 35 has a thickness of illustratively 5–10 $\mu$m. Inner-glass cladding layer 33 and outer-glass cladding layer 37 both have an illustrative thickness of approximately 25 $\mu$m. As previously noted, the glass compositions, used for the ring core, and the inner- and outer-glass cladding layers, are chosen such that the index of refraction of the ring core is higher than that of both the inner- and outer-cladding layers. This ensures that any light, striking the interface between optical ring core 35 and either the inner- or outer-glass cladding layers, is totally internally reflected into optical glass ring core 35. Thus, optical ring core 35 functions as an optical waveguide while advantageously reducing the amount of attenuation experienced by any optical signals propagating therethrough. Using known methods, a dielectric or metallic hermetic coating layer (not shown), such as diamond-like carbon, silicon nitride, aluminum or gold, can be advantageously applied over the outer-glass cladding layer 37 so as to reduce static fatigue of the fiber by preventing moisture from contacting the outer surface of the glass cladding layer thereby maintaining the strength of the glass cladding layer at the pristine level. An opaque, preferably non-metallic, protective layer (not shown) comprised of compositions well-known to the art is concentrically applied over the hermetic coating layer using illustratively well-known polymeric coating techniques. This protective layer provides adequate protection for the optical fiber against abrasion, caustic environments, weather and similar adverse environmental effects without affecting the optical properties of the waveguide.

Advantageously, the maximum load bearing characteristic of the fiber can be increased by selecting appropriate materials for both the central core and all the glass layers such that the central core has a value of elastic modulus greater than or equal to that of each of the glass layer(s). The maximum load bearing characteristic can be increased even further if the gauge of the wire used for the central core and the thickness of all the glass layer(s) are chosen such that the cross-sectional areas for both the central core and all glass-cladding layers are approximately equal. Furthermore, if the protective layer has a sufficiently high elastic modulus and an appropriate cross-sectional area, then such a layer further increases the stress level to which the composite fiber can be safely subjected.

To illustrate the increase in stress loads that can be obtained by appropriately matching cross-sectional areas, consider FIG. 3 which depicts an enlarged cross-sectional view of a portion of the clad wire, shown in FIG. 2, taken in a longitudinal direction. As indicated, central metallic core 21 has a value of elastic modulus $E_1$ and glass cladding layer 25 has a value of elastic modulus $E_2$. The total stress force imparted to the clad wire is shown as F and is oriented in an upward direction.

Assume that the cross-sectional area ($A_1$) of the metallic core and that ($A_2$) of the glass-cladding layer are equal. If tungsten wire is used for metallic core 21 and a composition similar to fused silica is chosen for glass-cladding layer 25, then the respective values of the elastic moduli for the core and glass cladding layer, i.e., $E_1$ and $E_2$, respectively, are $E_1 = 50 \times 10^6$ psi and $E_2 = 10 \times 10^6$ psi. The total force, F, will then be distributed between the metallic core and the glass-cladding layer according to the following equation, where $F_1$ is the force experienced by the core and $F_2$ is the force experienced by the cladding layer:

$$\frac{F_2}{F_1} = \frac{E_2}{E_1} \cdot \frac{A_2}{A_1}$$

Since, here, the values of $A_1$ and $A_2$ are equal, and the value of $E_2$ is 20% of that of $E_1$, then the cladding layer, in accordance with the above formula, experiences a force, $F_2$, which is 20% of that seen by the metallic core. Specifically, if the suspended instrument package weighs 18 pounds, this weight, when applied across a total cross-sectional area of $4 \times 10^5$ in$^2$, results in a total force of 450,000 psi applied to the clad wire. If the instrument package were suspended by a solid glass fiber alone, i.e., one without a metallic core, this total force would ultimately stress the glass fiber beyond its breaking point. However, if a glass cladding layer having a cross-sectional area of $2 \times 10^{-5}$ in$^2$ is clad to a tungsten wire core of cross-sectional area $2 \times 10^{-5}$ in$^2$, then the stress on the glass cladding layer is reduced to 75,000 psi and that experienced by the core is reduced to 375,000 psi. Both stress levels are advantageously well below the failure stress levels for the tungsten wire and the glass-cladding layer. Thus, a multi-kilometer length of a clad wire and/or optical fiber having an inorganic crystalline central core surrounded by one or more glass-cladding layers, as taught by the present invention, will advantageously sustain the stress imparted by a suspended instrument package over long periods of time.

Applicants' have successfully constructed a clad wire (similar in arrangement to that shown in FIGS. 2 and 3), which embodies the teachings of the present invention, using a tungsten wire core having a diameter of 175 μm and a single glass cladding layer comprised of low-alkali borosilicate glass having an outside diameter of 250 μm. Examination of cross-sections of this clad wire fabricated by applicants indicated that intermittent gaps of less than 2 μm in diameter existed at the interface between the tungsten wire and the borosilicate glass cladding layer and thus corroborated the existence of a high quality bond between these layers. The quality of the bonding at the interface between the tungsten wire and the borosilicate glass is such that 5-7 K psi of compression exists in the glass cladding layer after the tungsten wire has cooled to room temperature and contracted after being heated during the application of the glass cladding layer. This advantageously increases the tensile stress load that the clad wire can withstand. Values of compression higher than 5-7 kpsi, which further improve the load bearing capability of the clad wire, can be easily achieved through appropriate selection of the material used for the central core, e.g. using aluminum or copper, and using a high silica glass for the cladding layer. Alternatively, high values of compression can be achieved by placing the wire under tension and maintaining that tension until after the glass has cooled below the glass transition temperature, i.e., the temperature below which no stress in the glass can be relieved through viscous flow. Furthermore, experimental glass clad wire embodying the principles of the instant invention have also been successfully constructed by applicant with tungsten cores of 75 to 175 μm in diameter and separate claddings of borosilicate and tungsten sealing glass, each having an outside diameter ranging from 225 to 375 μm.

Of course, it will be appreciated by those skilled in the art that both optical and electrical signals can be simultaneously transmitted through the inventive concentric core optical fiber described hereinabove. Specifically, signals such as data and/or control signals which require a wide bandwidth can be transmitted as optical signals which propagate through optical ring core 35 shown in FIG. 4. High current low bandwidth signals such as control and/or power signals can be advantageously transmitted in electrical form through metallic core 31. A metallic layer which might serve as a hermetic coating layer advantageously serves as a return path for these electrical signals, can also be clad over any or all of the glass cladding layers. Moreover, with this arrangement, a coaxial cable will be formed having a metallic core, a glass dielectric comprised of various glass layer(s) and a conductive shield comprised of the metallic cladding layer. Consequently, radio frequency signals can be advantageously transmitted through this coaxial path, in addition to optical signals being propogated through the glass cladding layers and control and/or power signals propagating through the core and metallic return path.

Furthermore, the core constructed in accordance with the teachings of this invention, is not limited to having only a circular shaped cross-section. Advantageously, the cross-sectional shape of the core can take on any closed shape, illustratively square, rectangular, triangular, or oval. Such an optical fiber, having a rectangular cross-section of appropriate dimensions (width much greater than height, for example), could find particular use in those applications which cannot accommodate an optical fiber having a relatively large diameter.

In addition, the central core need not be a single solid wire but instead can be comprised of a number of separate wire strands which are twisted together. This arrangement can be used to advantageously increase the tensile strength of the cable while utilizing inexpensive small gauge wire to construct the core.

Moreover, any number of glass cladding layers can be concentrically and coaxially applied over the central core. Each of these layers can have a wide range of design parameters, such as a stepped refractive index or a graded refractive index, and single or multi-mode propagation capability. In such an arrangement, a number of different optical signals can advantageously propagate through different concentrically oriented optical ring cores, separated by appropriate glass cladding layers.

Although a specific illustrative embodiment has been shown and described herein, this merely illustrates the principles of the present invention. Many and varied arrangements embodying these principles may be devised by those skilled in the art without departing from the spirit and scope of the invention.

What is claimed is:

1. A high tensile strength optical fiber comprising: an inorganic crystalline core, and a plurality of separate glass cladding layers, each having a respective index of refraction, concentrically clad around the crystalline core, and forming a light-transmissive optical waveguide having an optical ring core surrounded by separate inner- and outer-glass cladding layers wherein the index of refraction of the ring core is higher than the respective index of refraction of the inner- and outer-glass cladding layers.

2. The fiber in claim 1 wherein the crystalline core has a value of elastic modulus equal to or greater than that of any of the glass cladding layers.

3. The fiber in claim 2 wherein each of glass cladding layers has a thermal expansion coefficient with a value less than that of the crystalline core.

4. The fiber in claim 3 wherein the glass cladding layers exist in a state of compression at room temperature.

5. The fiber in claim 4 wherein the crystalline core is substantially metallic.

6. The fiber in claim 5 wherein the crystalline core is substantially comprised of one of the following elements from the group consisting of tungsten, titanium, nickel, molybdenum, iron, copper, and aluminum.

7. The fiber in claim 1 wherein each of glass cladding layers has a thermal expansion coefficient having a value less than that of the crystalline core.

8. The fiber in claim 7 in which the crystalline core is comprised of at least one of the following materials in the group consisting of boron nitride, silicon nitride, aluminum oxide or graphite.

9. The fiber in claim 7 wherein the glass cladding layers exist in a state of compression at room temperature.

10. A high tensile strength optical fiber comprising: an inorganic crystalline core, and at least one layer of glass concentrically clad to the core wherein the crystalline core and glass clad layer are of different materials and the core has a thermal expansion coefficient value equal to or greater than that of the glass clad layer whereby a tensile load applied to the fiber, which is greater than the tensile strength of the glass clad layer alone, is balanced between the core and the glass clad layer such that the tensile load borne by the glass clad layer is less than the tensile strength of the last clad layer.

11. The fiber in claim 10 wherein the glass cladding layers exist in a state of compression at room temperature.

12. The fiber in claim 11 wherein the crystalline core has a value of elastic modulus equal to or greater than that of any of the glass cladding layers.

13. The fiber in claim 12 wherein the crystalline core is substantially metallic.

14. The fiber in claim 13 wherein the crystalline core is substantially comprised of one of the following elements from the group consisting of tungsten, titanium, nickel, molybdenum, iron, copper, and aluminum.

15. The fiber in claim 12 in which the crystalline core is comprised of at least one of the following materials in the group consisting of boron nitride, silicon nitride, aluminum oxide or graphite.

* * * * *